(12) United States Patent
Zha et al.

(10) Patent No.: US 11,265,743 B2
(45) Date of Patent: Mar. 1, 2022

(54) SYSTEMS AND METHODS FOR LOCATING ALL SYNCHRONIZATION SIGNAL BLOCKS ON A 5G NR CHANNEL

(71) Applicant: PC-TEL, Inc., Bloomingdale, IL (US)

(72) Inventors: Wei Zha, Boyds, MD (US); Amir Soltanian, Potomac, MD (US); Antony Thanesh Soosai Retnam, Germantown, MD (US)

(73) Assignee: PCTEL, Inc., Bloomingdale, IL (US)

( * ) Notice: Subject to any disclaimer, the term of this patent is extended or adjusted under 35 U.S.C. 154(b) by 53 days.

(21) Appl. No.: 16/512,865

(22) Filed: Jul. 16, 2019

(65) Prior Publication Data

US 2021/0022019 A1    Jan. 21, 2021

(51) Int. Cl.
| | |
|---|---|
| *H04W 24/08* | (2009.01) |
| *H04B 17/318* | (2015.01) |
| *H04L 5/00* | (2006.01) |
| *H04W 84/04* | (2009.01) |

(52) U.S. Cl.
CPC .......... *H04W 24/08* (2013.01); *H04B 17/318* (2015.01); *H04L 5/0007* (2013.01); *H04W 84/042* (2013.01)

(58) Field of Classification Search
CPC ... H04L 5/0048; H04L 5/0051; H04L 5/0053; H04L 5/0057; H04L 5/0007; H04W 52/241; H04W 52/244; H04W 52/343; H04W 56/001; H04W 72/042; H04B 17/30–3913
See application file for complete search history.

(56) References Cited

U.S. PATENT DOCUMENTS

| | | | |
|---|---|---|---|
| 2016/0277225 A1* | 9/2016 | Frenne | H04L 27/261 |
| 2018/0048445 A1* | 2/2018 | Jung | H04L 5/0048 |
| 2018/0084593 A1 | 3/2018 | Chen et al. | |
| 2018/0270008 A1* | 9/2018 | Yi | H04W 72/1289 |
| 2018/0270771 A1 | 9/2018 | Kannan et al. | |

FOREIGN PATENT DOCUMENTS

WO     2019070184 A1    4/2019

OTHER PUBLICATIONS

Fabian Schuh, Synchronization and Cell Search, Feb. 4, 2010 (Year: 2010).*

(Continued)

*Primary Examiner* — Michael Thier
*Assistant Examiner* — Prince A Mensah
(74) *Attorney, Agent, or Firm* — Husch Blackwell LLP (57) ABSTRACT

Embodiments disclosed herein include systems and methods for locating all synchronization signal blocks on a 5G new radio channel. Such systems and methods can include measuring downlink signal energy over a bandwidth of the 5G new radio channel to identify a center frequency of a signal broadcast on the 5G new radio channel, processing the signal at the center frequency of the signal to identify a first of a plurality of synchronization signal blocks and global OFDM symbol boundaries for the wireless radio channel, and using the global OFDM symbol boundaries for all raster frequencies of the 5G new radio channel to identify remaining ones of the plurality of synchronization signal blocks.

19 Claims, 5 Drawing Sheets

(56) References Cited

OTHER PUBLICATIONS

Extended European search report for corresponding EP application 20185563.2, dated Nov. 25, 2020.
Oppo, "Remaining details on SS block transmissions", 3GPP TSG RAN WG1 Meeting 91 Reno, USA, Oct. 27-Nov. 1, 2017, R1-1720853, Draft, 3rd Generation Partnership Project (3GPP), Mobile Competence Centre, 650 Route Des Lucioles, F-06921, Sophia-Antipolis Cedex France, pp. 1-3, dated Nov. 1, 2017.
Qualcomm Incorporated, "Synchronization Block Design Implications on RAN4", 3GPP TSG-RAN WG4 RAN4 #83 Draft; R4-1704568, Hangzhou, China, May 19-25, 2017, 3rd Generation Partnership Project (3GPP), Mobile Competence Centre ; 650, Route Des Lucioles ; F-06921 Sophia-Antipolis Cedex France, URL:http://www.3gpp.org/ftp/Meetings_3GPP_SYNC/RAN4/Docs/, dated May 14, 2017.
Fabian Schuh, "LTE: Der Mobilfunk der Zukunft. Synchronization and Cell Search", Ausgewähite Kapitel der Nachrichtentechnik, WS 2009/2010, URL: http://www.lmk.Int.de/fileadmin/Lehre/Seminar09/Ausarbeitungen/Ausarbeitung_Schuh.pdf, dated Feb. 4, 2010.
Javier Campos, NR Physical Layer Architect, RAN1 Delegate, Understanding the 5G NR Physical Layer, Keysight Technologies, Nov. 1, 2017.
3rd Generation Partnership Project; Technical Specification Group Radio Access Network; NR; Physical channels and modulation (Release 15); 3GPP TS 38.211 V15.2.0 (Jun. 2018), 3GPP.
3rd Generation Partnership Project; Technical Specification Group Radio Access Network; NR; Base Station (BS) radio transmission and reception (Release 15), 3GPP TS 38.104 V15.3.0 (Sep. 2018), 3GPP.

* cited by examiner

SYSTEMS AND METHODS FOR LOCATING ALL SYNCHRONIZATION SIGNAL BLOCKS ON A 5G NR CHANNEL

FIELD

The present invention relates generally to radio frequency (RF) communications hardware. More particularly, the present invention relates to systems and methods for locating all synchronization signal blocks (SSBs) on a 5G new radio (NR) channel.

BACKGROUND

Wireless cellular technology has expanded to adopt a 5G standard that can operate in a stand-alone mode or a non-stand-alone mode and include use of a 5G NR channel that can have one or more SSBs. In the stand-alone mode, the 5G NR channel can include only one cell-defining SSB located on a wide global synchronization raster with a corresponding global synchronization channel number (GSCN). For example, for a frequency range above 24.25 GHz (i.e., an FR2 section of the 5G standard), a GSCN raster step size is 17.28 MHz. Because there are only several candidate frequencies to search for, user equipment can feasibly search for the cell-defining SSB at start up, and after the user equipment is connected to the 5G NR channel, the user equipment can receive radio resource control commands to search for other SSBs at different frequencies that are not necessarily on the global synchronization raster. The other SSBs can be located on any frequency within a bandwidth of the 5G NR channel bandwidth on a new radio absolute radio frequency channel number (NR-ARFCN) raster, which is narrower than the global synchronization raster. For example, for the FR2 section of the 5G standard, a NR-ARFCN raster step size is only 60 KHz. Accordingly, locating the other SSBs in the stand-alone mode is feasible. In the non-stand-alone mode, the user equipment can receive SSB frequency information from a radio resource control command after the user equipment is connected to a 4G LTE network, but in the non-stand-alone mode the SSBs do not have to be located on the global synchronization raster. Accordingly, locating the SSBs in the non-stand-alone mode is also feasible.

In some instances, network monitoring and measuring can require blindly searching for and identifying all of the SSBs of the 5G NR channel, not just the one cell-defining SSB, thereby requiring the user equipment to search every NR-ARFCN raster frequency for a valid cell. However, the bandwidth of the 5G NR channel is wide. For example, a minimum channel bandwidth is 100 MHz for the FR2 frequency section of the 5G standard, a maximum channel bandwidth is 400 MHz for the FR2 frequency section of the 5G standard, and the bandwidth of the SSB is typically 28.8 MHz for a sub-carrier spacing (SCS) of 120 KHz. These features of the 5G NR channel mean that, for the FR2 frequency section of the 5G standard, one of the SSBs can be located on, at a minimum, any one of 1186 NR-ARFCN raster frequencies. Thus, in order to blindly scan for and identify all of the SSBs, a scanning receiver needs to perform a primary synchronization signal (PSS) correlation search on every sample time offset for each raster frequency candidate, which can be prohibitive in terms of time and cost when multiplied with a large number of frequencies.

In view of the above, there is a continuing, ongoing need for improved systems and methods.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Figure 1:
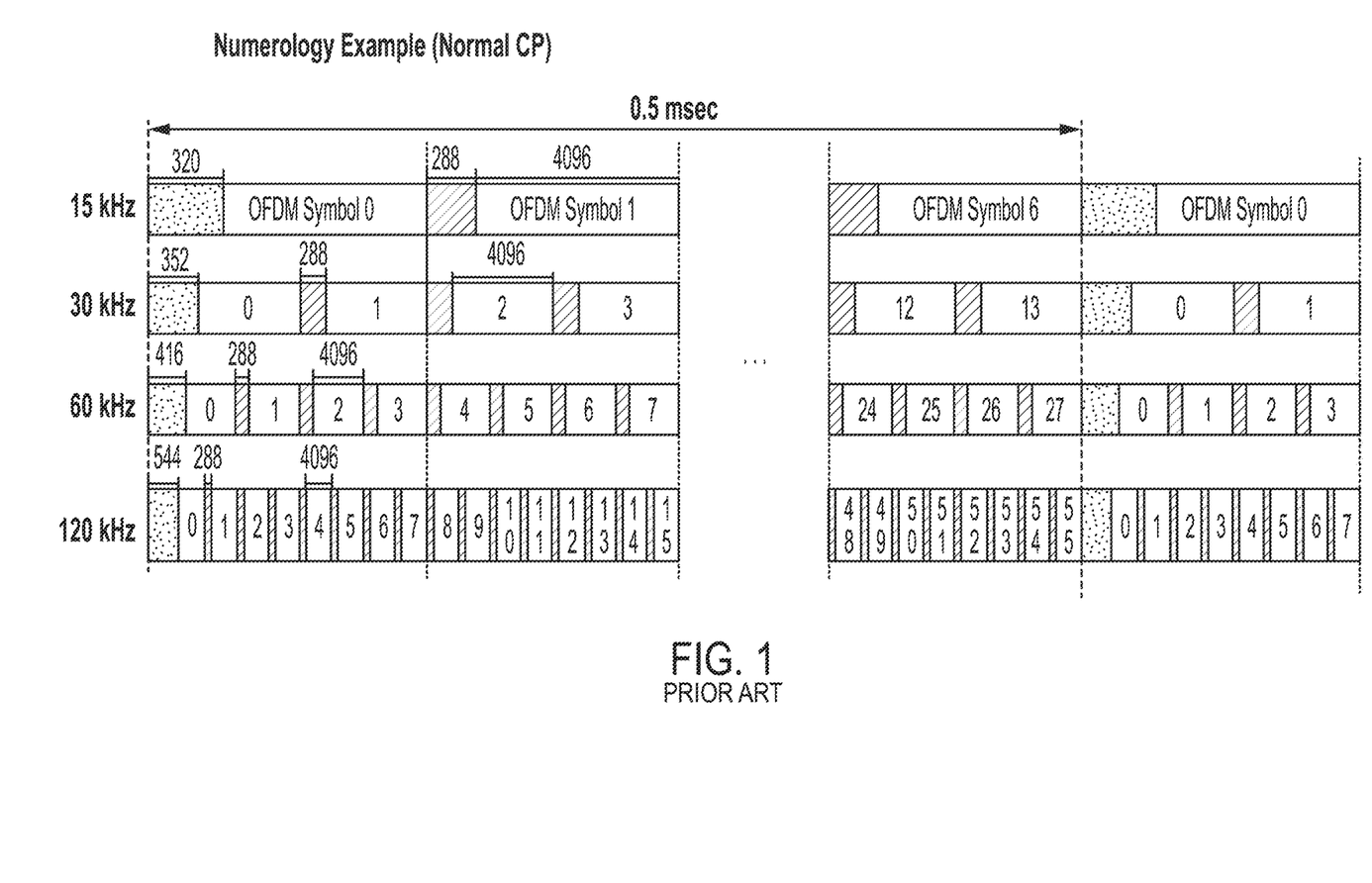
FIG. 1 is a graph of OFDM symbol alignment at different frequencies as known in the art.

Embodiments disclosed herein can include systems and methods for locating all SSBs on a 5G NR channel. In particular, as seen in FIG. 1, it is known that the 5G NR channel uses orthogonal frequency-division multiplexing (OFDM) symbols that are synchronized in time for different frequencies and different SCS sizes. The system and methods described herein can identify global OFDM symbol boundaries for all of the 5G NR channel and then apply the global OFDM symbol boundaries to all raster frequencies of the 5G NR channel to identify all of the SSBs.

For example, the systems and methods described herein can include measuring downlink signal energy over a bandwidth of the 5G NR channel to identify a center frequency of a signal broadcast on the 5G NR channel. Then, the systems and methods described herein can include processing the signal at the center frequency of the signal to identify a first one of the SSBs and the global OFDM symbol boundaries for the 5G NR channel and using the global OFDM symbol boundaries for all of the raster frequencies of the 5G NR channel to identify remaining ones of the SSBs.

In some embodiments, measuring the downlink signal energy can also include identifying frequency edges of the signal, and in these embodiments, the systems and methods described herein can identify the center frequency of the signal and the frequency edges of the signal by using a slope algorithm to identify a power and a bandwidth of the signal.

In some embodiments, the 5G NR channel can be located adjacent to LTE channels, and in these embodiments, measuring the downlink signal energy can include locking to the LTE channels instead of the 5G NR channel. However, because the LTE channels are synchronized in time with the 5G NR channel, the global OFDM symbol boundaries of the LTE channels and the 5G NR channel are aligned. Therefore, when the systems and methods described herein lock to the LTE channels, the systems and methods described herein also lock to the 5G NR channels.

Figure 2:
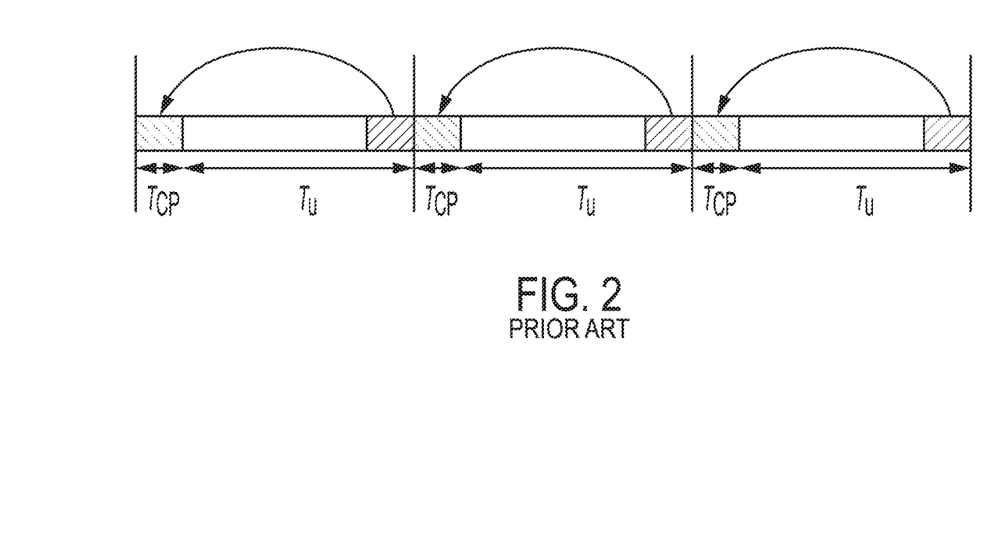
FIG. 2 is a graph of CP-OFDM use on a 5G NR channel in a downlink transmission as known in the art.

In some embodiments, the systems and methods described herein can include calculating a cyclic prefix (CP) correlation of the signal at the center frequency of the signal to identify the first one of the SSBs and the global OFDM symbol boundaries. In particular, as seen in FIG. 2, it is known that the 5G NR channel uses CP-OFDM in a downlink transmission, which copies a CP length $T_{cp}$ of a last portion of a current OFDM symbol of length Tµ and inserts that CP length $T_{cp}$ ahead of the current OFDM symbol. The systems and methods described herein can use this repetition of the CP length to perform the CP correlation. For example, where a sampled signal sequence is s(i), i=0, 1 . . . M, an OFDM symbol length is N samples, and the CP length is CP, the CP correlation can be calculated for an offset i using Equation 1.

$$Corr_{CP}(i) = \sum_{k=0}^{CP-1} s(i) * s(i+N)^*$$ Equation 1

In some embodiments, the CP correlation of the signal can be calculated at the center frequency of the signal as a moving correlation. For example, when calculating the CP correlation for a next sample time offset, an oldest term can be removed from the summation, and a new term can be added. In some embodiments, results of the CP correlation can be complex numbers that can be squared to identify an energy value for comparison. In these embodiments, OFDM symbol start timing can be found by a maximum squared CP correlation peak, and this OFDM symbol boundary can be applied to all of the raster frequencies of the 5G NR channel thereafter.

In some embodiments, the downlink transmission can include both a data transmission and a sync transmission (e.g., the SSBs), and in these embodiments, the SSBs can use a different SCS than the data transmission. For example, in the FR2 frequency section of the 5G standard, the data transmission can use a SCS of 60 KHz, but the SSBs can use a SCS of 120 KHz. This larger SCS can provide more resistance to frequency drift introduced by an oscillator at a mmWave frequency. In particular, as seen in FIG. 1, the CP length of a first OFDM symbol of a 0.5 ms long half sub-frame can be longer than the CP length of other OFDM symbols. This differentiation in length is designed to align half sub-frames for different sizes of SCS. For example, Table 1 identifies the CP length of all of the OFDM symbols when an OFDM sample length is 512 samples.

TABLE 1

CP Length of Different Numerology for Normal CP

| SCS (KHz) | CP length of 1st OFDM symbol | CP length of rest OFDM symbols |
|---|---|---|
| 15 | 40 | 36 |
| 30 | 44 | 36 |
| 60 | 52 | 36 |
| 120 | 68 | 36 |
| 240 | 100 | 36 |

The 5G NR channel is designed to have flexible slot formats configured to be downlink, uplink, or flexible, but the first OFDM symbol is always downlink or flexible, and the other OFDM symbols can be any of downlink, uplink, or flexible. Therefore, the first OFDM symbol has a greater chance than the other OFDM symbols to receive the downlink transmission, which, together with the CP length that is longer, makes it more desirable to correlate with the CP length of the first OFDM symbol if present. However, it is possible that the CP length of the first OFDM symbol is not present, and under such circumstances, the CP correlation of the signal at the center frequency of the signal can be calculated twice: one time assuming a first SCS (e.g. 60 KHz) and another time assuming a second, different SCS (e.g. 120 KHz). Then, the systems and methods described herein can select a result from both of such calculations with a highest correlation value to use in identifying the first one of the SSBs and the global OFDM symbol boundaries.

In some embodiments, after the global OFDM symbol boundaries are identified, the systems and methods described herein can include calculating a PSS correlation at the global OFDM symbol boundaries for all of the raster frequencies to identify the remaining ones of the SSBs. Advantageously, the systems and methods described herein have substantially reduced processing time when compared with known systems and methods because the PSS correlation on all of the raster frequencies does not need to be performed at every sample time offset. Instead, the PSS correlation can be limited to only the global OFDM symbol boundaries.

For example, in known systems and methods where the PSS correlation is performed at every sample time offset for every NR-ARFCN raster frequency, the OFDM symbol length is 512 samples, and the CP length is 36 samples, the PSS correlation needs to be repeated for all 548 possible sample time offsets. With a large number of NR-ARFCN raster frequencies, total processing is very high, which results in a low scan speed. However, in the systems and methods described herein where the PSS correlation is only calculated at the global OFDM symbol boundaries identified, signal processing can theoretically be performed only once versus the 548 times required by known systems and methods for a total processing saving time of 548:1.

In embodiments in which the CP length of the first OFDM symbol of every half sub-frame is longer than the CP length of the other OFDM symbols, the CP correlation can only identify the global OFDM symbol boundaries, but not an OFDM symbol index within the half sub-frame. Therefore, in these embodiments, when the global OFDM symbol boundaries are applied to all of the raster frequencies, the PSS correlation can be calculated twice: one time where the global OFDM symbol boundaries for all of the raster frequencies are presumed to identify the first OFDM symbol in the half sub-frame and another time where the global OFDM symbol boundaries for all of the raster frequencies are not presumed to identify the first OFDM symbols in the half sub-frame. Thus, where the PSS correlation is performed twice, the amount of processing saving time as compared with known systems and methods can be reduced to 548:2.

In some embodiments, the systems and methods described herein can perform a secondary synchronization signal correlation at peak values for results of the PSS correlation for all of the raster frequencies to identify the remaining ones of the SSBs. For example, in some embodiments, the systems and methods described herein can perform DM-RS correlation at the global OFDM symbol boundaries for all of the raster frequencies to identify channel estimates, and the systems and methods described herein can perform MIB decoding and demodulation on the channel estimates to identify the remaining ones of the SSBs.

The systems and methods described herein can be used to find all valid LTE channels of a specific LTE band. For example, for LTE bands above 2 GHz with a total bandwidth in a range of 100 MHz and an LTE channel raster size of 100 KHz, a channel search in known systems and methods can start with the PSS correlation on every sample time offset. However, the systems and methods described herein can perform the CP correlation to identify the global OFDM symbol boundaries on every 5 MHz frequency step. Then, the systems and methods described herein can use the global OFDM symbol boundaries to perform the PSS correlation only at the global OFDM symbol boundaries for all candidate raster frequencies within 5 MHz.

Figure 3:
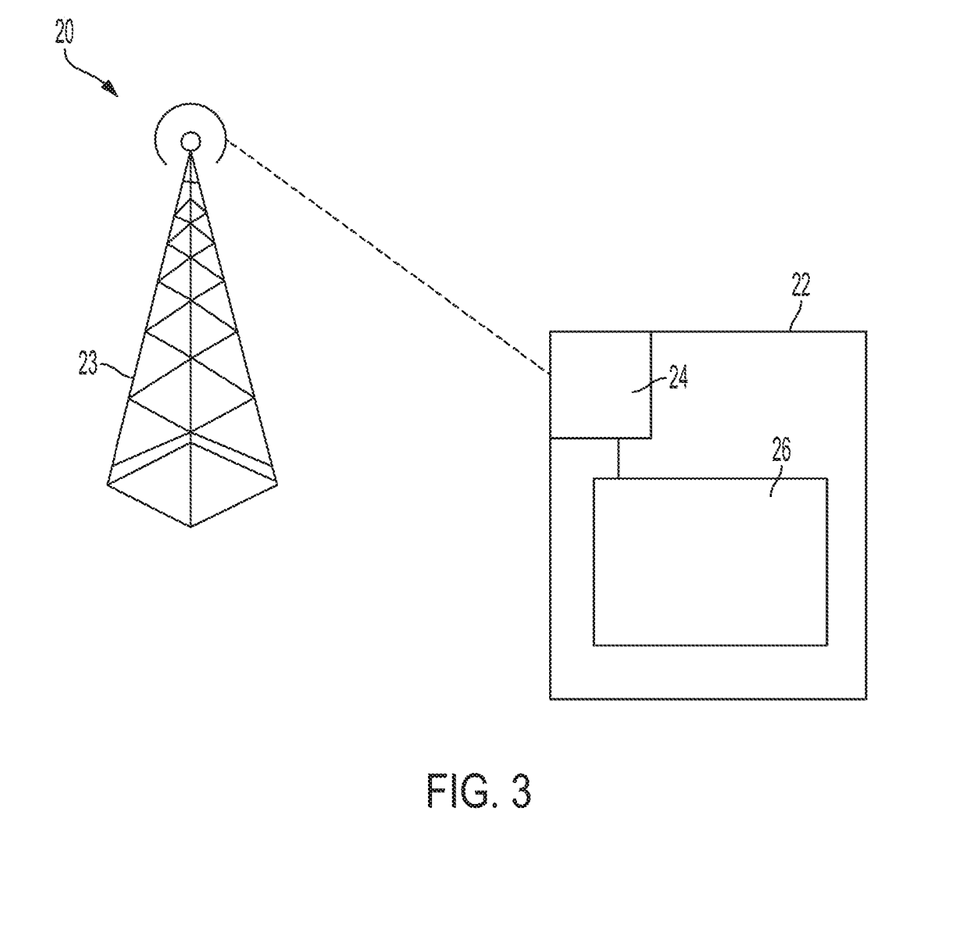
FIG. 3 is a block diagram of a system according to disclosed embodiments.

FIG. 3 is a block diagram of an RF communications system 20 according to disclosed embodiments. As seen in FIG. 3, the RF communications system 20 can include user equipment 22 and broadcast equipment 23, and the user equipment 22 can include a programmable processor 26 and an RF transceiver 24 that can receive RF signals broadcast by the broadcast equipment 23.

Figure 4:
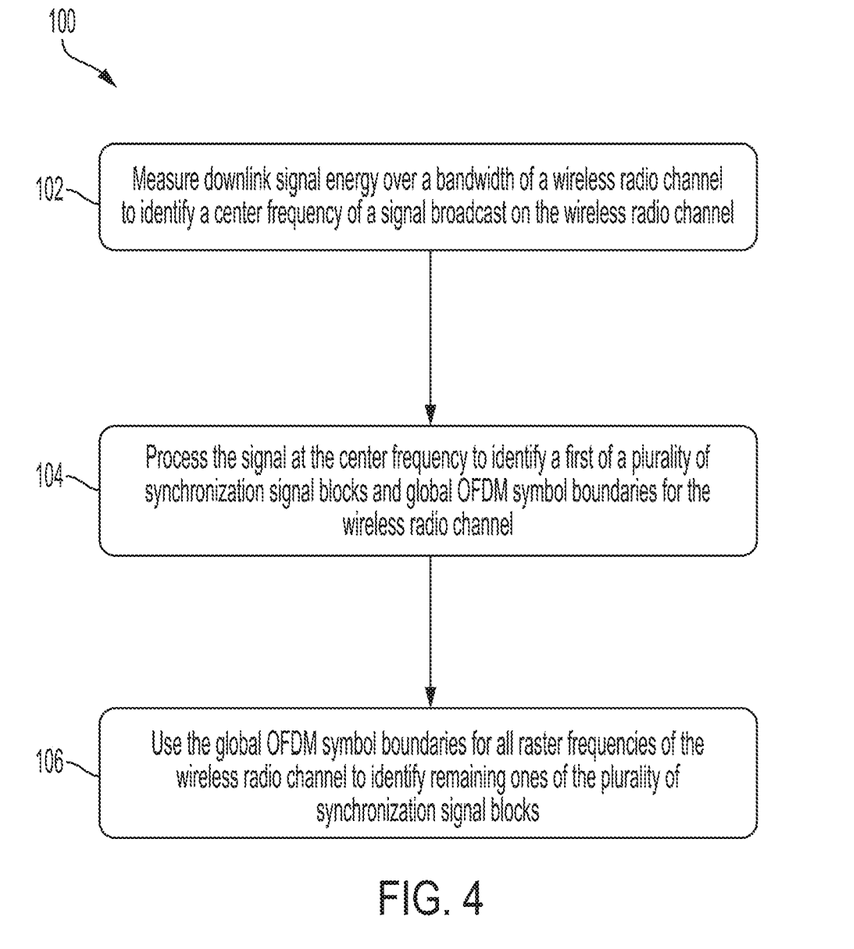
FIG. 4 is a flow diagram of a method according to disclosed embodiments.

FIG. 4 is a flow diagram of a method 100 according to disclosed embodiments. As seen in FIG. 4, the method 100 can include the programmable processor 26 measuring downlink signal energy over a bandwidth of a wireless radio channel to identify a center frequency of a signal broadcast on the wireless radio channel by the broadcast equipment 23, as in 102. Then, the method 100 can include the programmable processor 26 processing the signal at the center frequency of the signal to identify a first of a plurality of SSBs and global OFDM symbol boundaries for the wireless radio channel, as in 104. Finally, the method 100 can include the programmable processor 26 using the global OFDM symbol boundaries for all raster frequencies of the wireless radio channel to identify remaining ones of the plurality of SSBs, as in 106.

Figure 5:
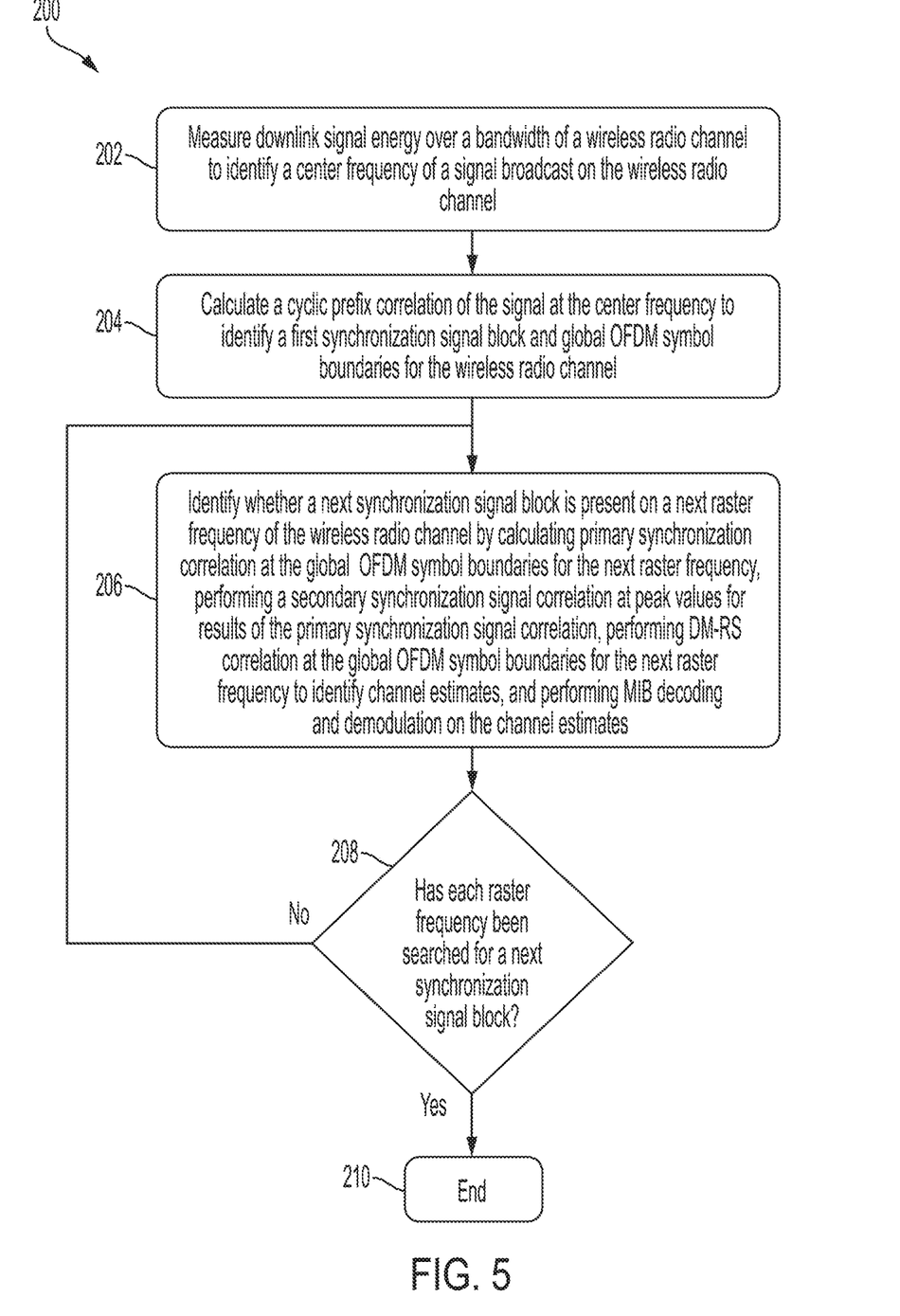
FIG. 5 is a flow diagram of a method according to disclosed embodiments.

FIG. 5 is a flow diagram of a method 200 according to disclosed embodiments and illustrates one embodiment of the method 100 of FIG. 4. As seen in FIG. 5, the method 200 can include the programmable processor 26 measuring downlink signal energy over a bandwidth of a wireless radio channel to identify a center frequency of a signal broadcast on the wireless radio channel by the broadcast equipment 23, as in 202. Then, the method 200 can include the programmable processor 26 calculating a CP correlation of the signal at the center frequency of the signal to identify a first SSB and global OFDM symbol boundaries for the wireless radio channel, as in 204. Next, the method 200 can include the programmable processor 26 identifying whether a next SSB is present on a next raster frequency of the wireless radio channel by calculating a PSS correlation at the global OFDM symbol boundaries for the next raster frequency, performing a secondary synchronization signal correlation at peak values for results of the PSS correlation, performing DM-RS correlation at the global OFDM symbol boundaries for the next raster frequency to identify channel estimates, and performing MIB decoding and demodulation on the channel estimates, as in 206.

After identifying whether the next SSB is present on the next raster frequency as in 206, the method 200 can include the programmable processor 26 determining whether each raster frequency been searched for the next SSB, as in 208. If so, then the method 200 can terminate, as in 210. However, when each raster frequency has not been searched, the method 200 can include the programmable processor 26 continuing to identify whether a next synchronization signal block is present on a next raster frequency of the wireless radio channel, as in 206.

Although a few embodiments have been described in detail above, other modifications are possible. For example, other components may be added to or removed from the described systems, and other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
measuring downlink signal energy over a bandwidth of a wireless radio channel to identify a center frequency of a signal broadcast on the wireless radio channel;
calculating a cyclic prefix correlation of the signal at the center frequency of the signal to identify a first of a plurality of synchronization signal blocks and global OFDM symbol boundaries for the wireless radio channel; and
calculating a primary synchronization signal correlation at the global OFDM symbol boundaries for all raster frequencies of the wireless radio channel to identify remaining ones of the plurality of synchronization signal blocks.

2. The method of claim 1 further comprising:
performing a secondary synchronization signal correlation at peak values for results of the primary synchronization signal correlation for all of the raster frequencies.

3. The method of claim 1 further comprising:
performing DM-RS correlation at the global OFDM symbol boundaries for all of the raster frequencies to identify channel estimates; and
performing MIB decoding and demodulation on the channel estimates.

4. The method of claim 1 further comprising:
calculating the primary synchronization signal correlation at the global OFDM symbol boundaries for all of the raster frequencies by calculating the primary synchronization signal correlation on each of the OFDM symbol boundaries for all of the raster frequencies a first time and calculating the primary synchronization signal correlation on each of the OFDM symbol boundaries for all of the raster frequencies a second time,
wherein, for the first time, the global OFDM symbol boundaries for all of the raster frequencies are presumed to indicate a first OFDM symbol in a half sub-frame of the signal, and
wherein, for the second time, the global OFDM symbol boundaries for all of the raster frequencies are not presumed to indicate the first OFDM symbol in the half sub-frame of the signal.

5. The method of claim 1 further comprising:
calculating the cyclic prefix correlation of the signal at the center frequency of the signal by calculating the cyclic prefix correlation of the signal at the center frequency of the signal a first time, calculating the cyclic prefix correlation of the signal at the center frequency of the signal a second time, and selecting a result of the cyclic prefix correlation with a highest correlation value to use in identifying the first of the plurality of synchronization signal blocks and the global OFDM symbol boundaries,
wherein, for the first time, a sub-carrier spacing of the signal is presumed to be a first value, and
wherein, for the second time, the sub-carrier spacing of the signal is presumed to be a second value that is different from the first value.

6. The method of claim 1 further comprising:
calculating the cyclic prefix correlation of the signal at the center frequency of the signal as a moving correlation.

7. The method of claim 1 further comprising:
identifying maximum squared peak output values from the cyclic prefix correlation to identify the global OFDM symbol boundaries.

8. The method of claim 1 wherein the wireless radio channel includes a 5G radio channel.

9. The method of claim 1 further comprising:
identifying frequency edges of the signal from measuring the downlink signal energy.

10. A system comprising:
a radio frequency transceiver; and
a programmable processor,
wherein the radio frequency transceiver receives a signal broadcast on a wireless radio channel, and
wherein the programmable processor measures downlink signal energy over a bandwidth of the wireless radio channel to identify a center frequency of the signal, calculates a cyclic prefix correlation of the signal at the center frequency of the signal to identify a first of a plurality of synchronization signal blocks and global OFDM symbol boundaries for the wireless radio channel, and calculates a primary synchronization signal correlation at the global OFDM symbol boundaries for all raster frequencies of the wireless radio channel to identify remaining ones of the plurality of synchronization signal blocks.

11. The system of claim 10 wherein the programmable processor performs a secondary synchronization signal correlation at peak values for results of the primary synchronization signal correlation for all of the raster frequencies.

12. The system of claim 10 wherein the programmable processor performs DM-RS correlation at the global OFDM symbol boundaries for all of the raster frequencies to identify channel estimates, and wherein the programmable processor performs MIB decoding and demodulation on the channel estimates.

13. The system of claim 10 wherein the programmable processor calculates the primary synchronization signal correlation at the global OFDM symbol boundaries for all of the raster frequencies by calculating the primary synchronization signal correlation on each of the OFDM symbol boundaries for all of the raster frequencies a first time and calculating the primary synchronization signal correlation on each of the OFDM symbol boundaries for all of the raster frequencies a second time, wherein, for the first time, the global OFDM symbol boundaries for all of the raster frequencies are presumed to indicate a first OFDM symbol in a half sub-frame of the signal, and wherein, for the second time, the global OFDM symbol boundaries for all of the raster frequencies are not presumed to indicate the first OFDM symbol in the half sub-frame of the signal.

14. The system of claim 10 wherein the programmable processor calculates the cyclic prefix correlation of the signal at the center frequency of the signal by calculating the cyclic prefix correlation of the signal at the center frequency of the signal a first time, calculating the cyclic prefix correlation of the signal at the center frequency of the signal a second time, and selecting a result of the cyclic prefix correlation with a highest correlation value to use in identifying the first of the plurality of synchronization signal blocks and the global OFDM symbol boundaries, wherein, for the first time, a sub-carrier spacing of the signal is presumed to be a first value, and wherein, for the second time, the sub-carrier spacing of the signal is presumed to be a second value that is different from the first value.

15. The system of claim 10 wherein the programmable processor calculates the cyclic prefix correlation of the signal at the center frequency of the signal as a moving correlation.

16. The system of claim 10 wherein the programmable processor identifies maximum squared peak output values from the cyclic prefix correlation to identify the global OFDM symbol boundaries.

17. The system of claim 10 wherein the wireless radio channel includes a 5G radio channel.

18. The system of claim 10 wherein the programmable processor identifies frequency edges of the signal from measuring the downlink signal energy.

19. A method comprising:
measuring downlink signal energy over a bandwidth of a LTE radio band to identify a center frequency of a signal broadcast on the LTE radio band;
calculating a cyclic prefix correlation of the signal at the center frequency of the signal to identify global OFDM symbol boundaries for the LTE radio band; and
calculating a primary synchronization signal correlation at the global OFDM symbol boundaries for all raster frequencies of the LTE radio band to identify a valid LTE channel.

* * * * *